(12) United States Patent
Witulski et al.

(10) Patent No.: US 10,464,118 B2
(45) Date of Patent: Nov. 5, 2019

(54) METHOD FOR PRODUCING A CONTOURED RING ROLLING PRODUCT

(71) Applicant: Otto Fuchs Kommanditgesellschaft, Meinerzhagen (DE)

(72) Inventors: Thomas Witulski, Meinerzhagen (DE); Jörg Ihne, Plettenberg (DE); Stefan Teschner, Kierspe (DE); Christof Müller, Finnentrop (DE)

(73) Assignee: OTTO FUCHS KOMMANDITGESELLSCHAFT, Meinerzhagen (DE)

( * ) Notice: Subject to any disclaimer, the term of this patent is extended or adjusted under 35 U.S.C. 154(b) by 163 days.

(21) Appl. No.: 15/735,913

(22) PCT Filed: Jul. 31, 2015

(86) PCT No.: PCT/EP2015/067629
§ 371 (c)(1),
(2) Date: Dec. 12, 2017

(87) PCT Pub. No.: WO2017/020922
PCT Pub. Date: Feb. 9, 2017

(65) Prior Publication Data
US 2018/0178270 A1    Jun. 28, 2018

(51) Int. Cl.
*B21B 38/00* (2006.01)
*B21C 51/00* (2006.01)
(Continued)

(52) U.S. Cl.
CPC .............. *B21H 1/06* (2013.01); *B21B 38/00* (2013.01); *B23P 15/006* (2013.01); *F01D 5/02* (2013.01);
(Continued)

(58) Field of Classification Search
CPC .. B21H 1/06; B21B 38/00; F01D 5/02; F01D 2300/17; F01D 2240/24; F01D 2230/26; B23P 15/006; B21C 51/00
See application file for complete search history.

(56) References Cited

U.S. PATENT DOCUMENTS

| 3,944,782 A | * | 3/1976 | Metcalfe | ............... B21B 45/004 |
| | | | | 219/152 |
| 2016/0082553 A1 | * | 3/2016 | Hua | ..................... B23P 15/001 |
| | | | | 29/890.12 |

FOREIGN PATENT DOCUMENTS

| CH | 618111 A5 | 7/1980 |
| JP | 1979-65371 B | * 7/1979 |

(Continued)

OTHER PUBLICATIONS

International Search Report dated Mar. 17, 2016 in parent application PCT/EP2015/067629. 10 pages.
(Continued)

*Primary Examiner* — Jacob J Cigna
(74) *Attorney, Agent, or Firm* — Polson Intellectual Property Law, PC; Margaret Polson

(57) ABSTRACT

A method for producing a contoured ring rolling product for a rotating application from a ring blank, with a ring rolling machine controlled in a process-monitored manner. At least one process window, extending over the rolling time, is defined in relation to preselected process parameters for the specific product on the basis of calibrating specimens brought into their final form by the ring rolling machine. The process window(s) monitored during the process is/are determined by the process parameters of calibrating specimens which produced rolled products meeting the requirements demanded of the ring rolling product. The preselected process parameters comprise at least two of ring growing rate, axial rolling force, radial rolling force, rolling time, and (Continued)

ring blank temperature. Ring blanks are subsequently rolled in a contoured manner with parameters of the rolled blanks being recorded with reference to the preselected process parameters and evaluated to ascertain whether they lie within the predefined process window(s), thereby determining whether they are accepted for further machining and/or processing.

17 Claims, 2 Drawing Sheets

(51) Int. Cl.
*B21H 1/06* (2006.01)
*B23P 15/00* (2006.01)
*F01D 5/02* (2006.01)

(52) U.S. Cl.
CPC .......... *B21C 51/00* (2013.01); *F05D 2230/26* (2013.01); *F05D 2240/24* (2013.01); *F05D 2300/17* (2013.01)

(56) References Cited

FOREIGN PATENT DOCUMENTS

| | | |
|---|---|---|
| JP | S54155977 A | 12/1979 |
| JP | 2000071039 A | 3/2000 |
| JP | 2007301604 A | 11/2007 |

OTHER PUBLICATIONS

Written Opinion of the International Searching Authority dated Mar. 17, 2016 in parent application PCT/EP2015/067629. 6 pages.

\* cited by examiner

METHOD FOR PRODUCING A CONTOURED RING ROLLING PRODUCT

BACKGROUND

The present disclosure refers to a ring rolling method for producing a contoured ring rolling product. The disclosure also refers to a rotating jet engine component made of a nickel-based alloy, which is produced by this method.

Ring rolling is a hot forming method used as an alternative to forging for producing rings, including contoured rings. While in forging a blank previously heated to forging temperature is brought into its desired shape inside a form by hot forming, in ring rolling a previously heated ring blank is rolled into the desired shape by one or more rolling steps. With respect to the forging process, ring rolling is considered to be much more flexible in terms of ring rolling products to be formed with a ring rolling machine. For contoured ring rolling, radial-axial rolling units are often used. In such ring rolling machines, both the ring height and the ring wall thickness are simultaneously reduced in one rolling step, in particular by introducing the respective desired contour. In order to obtain the desired ring rolled end product from a ring blank, it is normally required to perform the ring rolling process in multiple steps. Between each ring rolling step, the ring blank is heated again or reheated.

Each ring rolling machine is provided with a control device for controlling the rolling process. The control device monitors determined process parameters, such as the ring growing rate, the axial and radial rolling force, or the temperature of the rolled blank during the rolling process. In this control, a value is respectively set with respect to the respective process parameters. Due to tolerances in the geometry of the respective ring blank and the behavior of the same during rolling, errors in the ring geometry and/or in the texture of the finished ring rolled product may occur. Thus, ring rolling is not considered to have sufficient process safety for components with strict requirements. Thus, it is not used or it is only used as a preparatory step for the subsequent form forging step in such applications, where the ring rolled product has to be provided with tight tolerance limits and has to be reproducibly produced within these tolerance constraints. Components rotating at high speeds, such as components of jet plane or gas turbines, have to fulfill high requirements of the property profile of formed products. For this reason, such components, such as jet engine disks or the like, are formed by forging from a forged blank. Due to the small number of process parameters compared to ring rolling, parts—in particular parts having to fulfill high requirements at strict tolerance limits—may be produced by forging in a reproducible way, thus not including a manual intervention. Due to incremental forming in the axial and radial rolling gap and due to feedback control implemented in control of the rolling unit, the deformation is not constant across the circumference of the rolled ring. This can lead to an inhomogeneous circumferential structure of the ring, which may provide inhomogeneous properties of the disk of the engine. In case of large deviations of the monitored process parameters, it may be necessary to manually intervene in the ring rolling process. Moreover, it may not be assessed, if the ring rolled products actually fulfill the respective requirements. For this reason and due to the possible necessity of a manual intervention, ring rolled products, which have to be produced within tight tolerance limits, cannot be considered to be sufficiently reproducible.

Even when such high load rotating parts, such as turbine disks, may be reproducibly produced by swaging from a nickel-based alloy, certain drawbacks have to be taken into account. One drawback is the unavoidable burr on the forged product caused by forging, which has to be removed after the forming process. This requires a further processing step. The typical material used for such parts, such as a nickel-based alloy, is relatively expensive. The inevitable burr caused by forging which has to be subsequently removed thus requires a higher material use with respect to the forged product. Moreover, due to the required shape of the swaged product, a frequent drawback consists in that the structure of the forged products does not comply, in some areas, with requirements regarding a fine granularity, since in these areas rough grains are found, despite the forming. This can only be overcome by material thickening, which however is to be avoided.

The foregoing examples of the related art and limitations therewith are intended to be illustrative and not exclusive. Other limitations of the related art will become apparent to those of skill in the art upon a reading of the specification and a study of the drawings.

SUMMARY

In view of the foregoing, an aspect of the present disclosure is thus to propose a ring rolling method, with which components having strict property requirements and tolerance ranges may be produced while fulfilling the reproducibility requirement, whereby these parts may be used for rotating applications. The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

In one embodiment according to the present disclosure, a method is provided for reproducibly producing a contoured ring rolling product fulfilling requirements for a rotating application, with a ring rolling machine controlled in a process-monitored so manner, in particular from a metal ring blank of such a nature that it is susceptible to cracking, which may comprise the following steps:

defining at least one process window, extending over the rolling time, in relation to preselected process parameters for a specific ring rolling product that is to be brought into its final form by this ring rolling machine on the basis of calibrating specimens that have been brought into their final form by this ring rolling machine, based on calibrating specimens brought by this ring rolling machine into their final form, wherein the one or more process windows of process parameters monitored during the execution of the method are determined by the process parameters of those calibrating specimens whose rolling product fulfills the requirements to be fulfilled by the ring rolling product to be produced, wherein the preselected process parameters comprise at least two of the following process parameters:
ring growing rate,
axial rolling force,
radial rolling force,
rolling time,
temperature of the ring blank during the rolling process; and subsequently
ring rolling ring blanks in a contoured manner to produce the ring rolling products, wherein the current rolling process parameters of the rolled blank are detected with reference to the at least two selected process parameters and evaluated to ascertain whether these process parameters lie within the one or more predefined process windows, and only those ring rolling products that have been ring-rolled with process parameters that lie within the at least one process window are passed on for further machining and/or processing.

In a second embodiment according to the present disclosure, a method is provided for reproducibly producing a contoured ring rolling product fulfilling requirements for a rotating application, with a ring rolling machine controlled in a process-monitored manner, in particular from a metal ring blank of such a nature that it is susceptible to cracking, which may comprise the following steps:

defining at least one process window, extending over the rolling time, in relation to preselected process parameters for a specific ring rolling product so that is to be brought into its final form by this ring rolling machine on the basis of calibrating specimens that have been brought into their final form by this ring rolling machine, based on calibrating specimens brought by this ring rolling machine into their final form, wherein the one or more process windows of process parameters monitored during the execution of the method are determined by the process parameters of those calibrating specimens, whose rolling product fulfills the requirements to be fulfilled by the ring rolling product to be produced, wherein the preselected process parameters comprise at least two of the following process parameters:

ring growing rate,
axial rolling force,
radial rolling force,
rolling time,
temperature of the ring blank during the rolling process; and subsequently ring rolling ring blanks in a contoured manner to produce the ring rolling products, wherein at least one process parameter influencing a process window is used as a pilot variable for the machine-side rolling process control.

With both said methods, it is ensured that ring rolling products formed by the ring rolling machine may be formed even within narrow tolerance limits from the predefined ring blanks, without any manual intervention and thus in a reproducible way.

The process parameters for controlling the ring rolling machine are acquired based on calibrating specimens. To this end, exactly those ring blanks are used, from which the subsequent ring rolling product has to be made. Thus, the process parameters are also determined based on the rolling behavior of the ring blank and thus also on the material used for producing the ring blank, in addition to the rolling behavior of the ring rolling machine during rolling of such ring blank.

These process parameters are acquired over the rolling time, so that the definition of the process windows is influenced by changes, dependent on the rolling time, of the material behavior of the blank and/or of the rolling machine. Monitoring is performed on at least two process parameters, which are selected from the group comprising the following process parameters: ring growing rate, axial rolling force, radial rolling force, rolling time and temperature of ring blank during the rolling processes. It is also possible to define process windows for further process parameters. A selection of at least two process windows from present process parameters is however deemed sufficient. It is clear that with a higher number of monitored process parameters, for which process windows have been previously defined, the monitoring quality is improved.

The definition of the process windows is influenced by the reaction of the rolling machine to changes in the control. Insofar in this context it is ultimately irrelevant how a certain rolling machine reacts to a pre-control and subsequent control, since these are controlled by means of the calibrating specimens with reference to the desired rolling result—geometry and texture—and are changed until the ring rolling product having the desired properties is obtained.

From the process parameters, which are determined for rolling the calibrating specimens, process windows extending over the rolling time are defined. The process windows are respectively delimited by a lower setpoint curve and an upper setpoint curve. For these process windows, those process parameters are used, with which preliminary rolled products are obtained, that fulfill the requirements set for the subsequent ring rolling product. This may be performed, for example, by averaging or determining envelope curves of the process parameter curves, which influence such a process window. Similarly, from the process parameters of the calibrating specimens, the pre-control variables used for rolling the actual ring rolling product may be determined in a different way. By means of the lower and upper setpoint curves based on the process window, the energy input in the rolling process over the rolling time may also be defined.

If the process windows and thus the pre-control variables are determined over the rolling time, the actual production process may then start, by which ring blanks are rolled, typically by multiple steps, into the desired ring rolling products. In case of a multistep rolling, process windows are defined for each rolling step.

According to the first embodiment, the process parameters are monitored which influence the at least two predefined process windows. However, only those ring rolling products are supplied to the following machining and/or processing, whose current detected process parameters lie within the predefined process window. If a deviation is detected in a process window, the ring rolling products thus have abnormalities and are not sent to the subsequent machining and/or processing. It is thus ensured that only those ring rolling products which fulfill the required criteria are sent to the following machining and/or processing. This also comprises the requirement for a peripheral continuous texture.

Due to the typically variable material behavior of the rolling blank over the rolling time and process parameters, which take into account changes in the behavior of the ring rolling machine, the ring rolling products may be produced within narrow tolerance bands, in particular without requiring a manual intervention into the rolling process.

According to the second embodiment, the ring rolling machine is controlled over the rolling time having a predefined timing with pre-control variables, which may vary over the rolling time. These pre-control variables are thus dependent on the predefined process window. These may be disposed on a curve between the upper setpoint curve and the lower setpoint curve, wherein the path of this control curve does not have to correspond to the profile of the process window or of its upper and lower setpoint curve. Thus, the control of the ring rolling machine comprises the forming behavior of the ring blank and the behavior of the machine over the rolling time. Thus, it is therefore also possible to reproducibly produce ring rolling products within narrow tolerance limits with reference to geometry and texture.

In an elaboration of this method, the second embodiment method may be combined with the previously described first embodiment method.

In this method, it is particularly advantageous that the ring rolling machine itself does not require complex and costly extensions in order to produce ring rolling products within particularly narrow tolerances according to the requirements of reproducibility. The preexistent machine control of the ring rolling machine may instead be sufficient for monitoring the rolling process for producing reproducible ring rolling products. It is also advantageous that the method may be performed without risking the formation of coarse grains. Such a local grain growth may be avoided by a corresponding forming rate. Finally, in ring rolling, in each rolling step, each region in the cross section of the ring may be subject to a predefined forming rate. In ring rolling, the last rolling step, which in a forging process is responsible for the creation of permanent coarse grains, may be performed in a way that all cross-sectional regions of the ring are subject to a deformation, which is sufficient to effectively suppress the formation of any coarse grain.

Process windows will be set according to typical process parameters, which are monitored anyway on the side of the ring rolling machine, and from these the respective pre-control variables will be derived. The process windows comprise process parameters, such as the ring growing rate or the temperature of the rolling blank which changes during the rolling process, as resulting variables, while other process windows, such as the axial and/or radial rolling force or the rolling time, refer to actors influencing the rolling result. Preferably the process windows are defined by process parameters from each of both groups.

Besides the already-described advantages of reproducibility comprised in this concept of ring rolling, these methods also have the advantage, with respect to forging, that the quantity of unused material (material scrap) may be reduced to a minimum. It must also be noted that, with this ring rolling method, geometries may be obtained which cannot be achieved by forging, such as undercuts. For this reason, it is possible, for example, to produce in the same rolling process a ring rolling product containing multiple instances of the actual end product and in particular with a specular symmetry to each other. Thus, in a single rolling process, multiple initially-connected ring rolling products may be provided, wherein after rolling it is only necessary to separate the ring rolling products into the individual products. Such products are claimed within the scope of the present disclosure as ring rolling products.

Due to the described properties, the above methods are also suitable for producing ring rolling products made of cracking sensible alloys, such as in the case of nickel based alloys, for example UDIMET® 720 or Inconel® 718. This is due to the particular and very adaptable setting of the individual ring rolling steps. Thus, one application of this method is the production of ring rolling products made of such an alloy, in particular if these ring rolling products are used in high stress regions, such as in jet engines, for example, in particular also for rotating components.

In addition to the aspects and embodiments described above, further aspects and embodiments will become apparent by reference to the accompanying drawings and the detailed description forming a part of this specification.

BRIEF DESCRIPTION OF THE DRAWINGS

The present disclosure is described below in reference to the following figures.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

The process parameters for performing the ring rolling method are determined, as pre-control variables, by means of calibrating specimens. The calibrating specimens were obtained with ring blanks corresponding to those with which the subsequent ring rolling products are also obtained. For performing the calibrating test, in order to keep the number of calibrating specimens at a low level, process parameters obtained by previous simulations are used. From a determined number of calibrating specimens rolled on the ring rolling machine used for producing the ring rolling products, the process parameters are determined which have to be complied with, in order for the subsequent process for producing the desired ring rolling products to be performed without any manual intervention and within the desired tolerance limits. A radial-axial ring rolling machine is used. The evaluation is performed on the results of those calibrating specimens, with which within the observed rolling step, the desired rolling result regarding geometry and texture is obtained. From process parameters of the calibrating specimens with reference to certain process parameters, a lower setpoint curve and an upper setpoint curve were determined. The lower setpoint curve and the upper setpoint curve delimit a process window. Each ring blank laminated with process parameters lying within these process windows, thus fulfills the requirements set for the ring rolling product formed in this rolling step, in particular with reference to geometry and texture. Thus, only those ring rolling products, whose current process parameters lie within the predefined process window, are sent to subsequent machining and/or processing.

Figure 1:
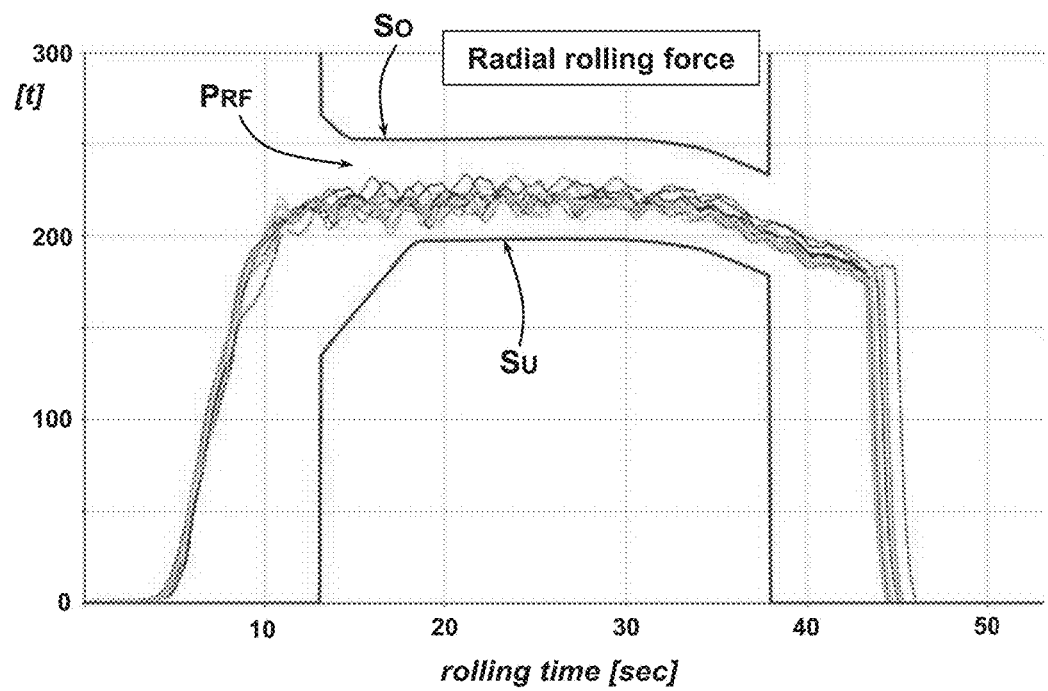
FIG. 1 shows a diagram representing the radial rolling force over the rolling time.

FIG. 1 shows the process window for the radial rolling force, which lies between a lower setpoint curve $S_u$ and an upper setpoint curve $S_o$. The process window is provided in FIG. 1 with reference $P_{RF}$. The curve of the process window $P_{RF}$ over the rolling time shows that, in this rolling step, the radial rolling force is not constant, but is lowered towards the end of the rolling step, in order to obtain the desired rolling result. In order for the ring rolling product to have the desired properties in the example shown, the method is performed by taking into account multiple process windows. For the ring rolling process for producing ring rolling products, the current process parameters are thus monitored at least with reference to the predefined process windows, and in particular in order to ascertain if deviations from the one or more process windows are detected.

Figure 2:
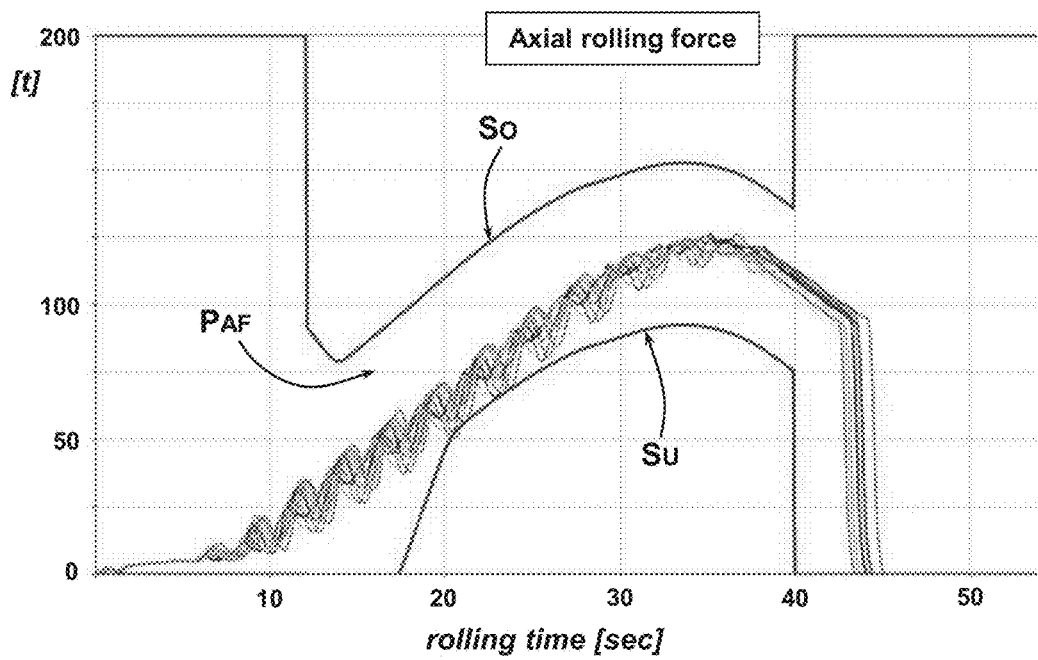
FIG. 2 shows a diagram representing the axial rolling force over the rolling time.

FIG. 2 shows a diagram corresponding to FIG. 1, in which the change of axial rolling force is shown over the rolling time. The corresponding process window $P_{AF}$, which is delimited by enveloping curves provided by the lower setpoint curve $S_u$ and upper setpoint curve $S_o$ shows another profile over time, contrary to process window $P_{RF}$. For obtaining the desired properties, while the radial rolling force has to remain almost constant within a first time interval up to a reduction, the axial rolling force has to increase to a maximum over the rolling time in order to also be reduced in a last rolling step.

In both diagrams of FIGS. 1 and 2, the curves of process parameters of ring blanks rolled with the ring rolling machine are shown, wherein the ring rolling machine has been controlled by pre-control variables with respect to radial and axial rolling force over rolling time, in order for the ring rolling product to fulfill the desired requirements. The oscillation width of the respectively observed process parameters—radial or axial rolling force—predominantly results from the machine-side feedback control of the radial or axial rolling gap.

Figure 3:
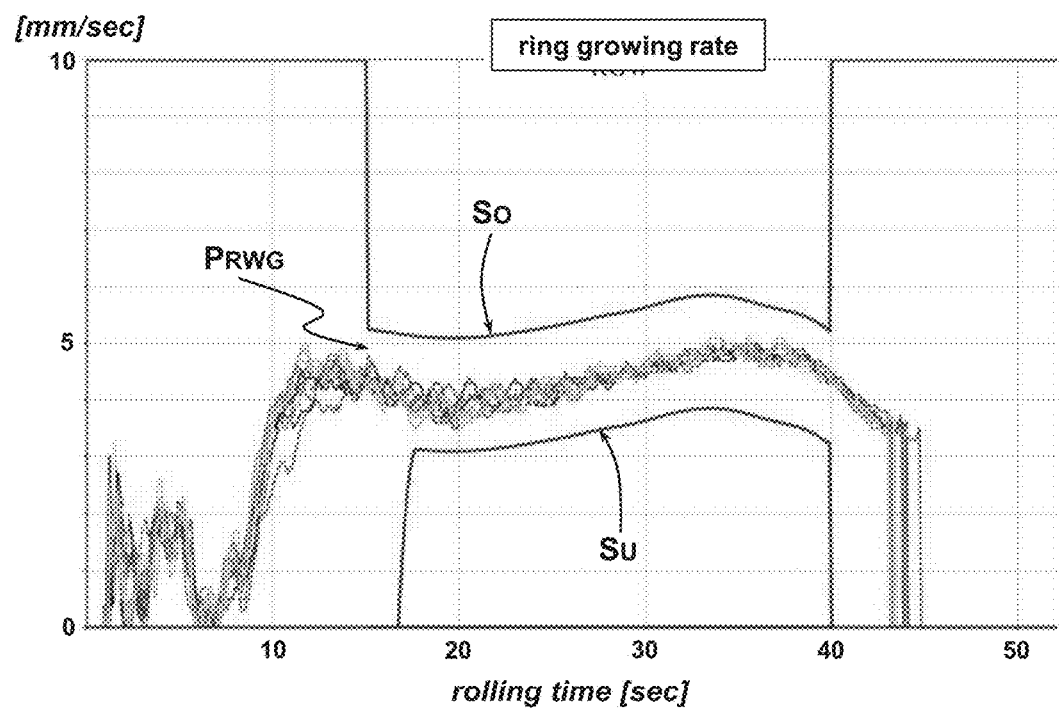
FIG. 3 shows a diagram representing the ring growing rate over the rolling time.

In the diagram of FIG. 3, the process window $P_{RGW}$ for the ring growing rate is shown over rolling time. The process window $P_{RGW}$ has been determined as already described for process windows $P_{RF}$ and $P_{AF}$. Also, with regard to process parameter ring growing rate, FIG. 3 clearly shows that in order to obtain the desired properties of the ring rolling product in this illustrative embodiment, the ring growth over rolling time is not constant. Typical for the ring growth is an initial transient, which ends after about eight seconds of rolling time. This is due to eccentricities and/or an uneven distribution of material in the ring blank. This is compensated in the first seconds of rolling.

Figure 4:
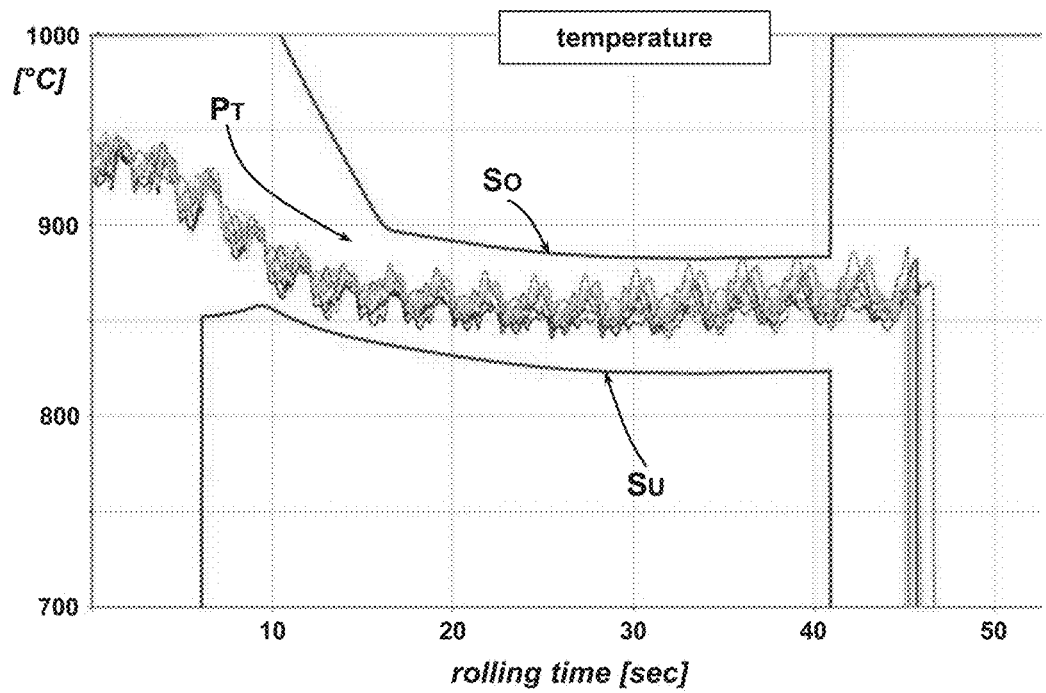
FIG. 4 shows a diagram representing the temperature of a rolling blank over the rolling time.

FIG. 4 shows the required temperature profile based on process window $P_T$, which has to be followed by a rolling blank in order for the ring rolling product to fulfill the requirements set for the ring rolling step in diagrams.

A monitoring of further process parameters may be performed in addition to process windows $P_{RF}$, $P_{AF}$, $P_{RGW}$ and $P_T$ in the diagrams of FIGS. 1 to 4.

The process windows shown as examples in the figures refer to a particular geometry of the ring rolling blank and of the ring rolling product obtained with the same. Therefore, it should be appreciated that for a different geometry and/or material, the process windows for obtaining the respective desired ring rolling product may have a different profile over rolling time. The ring blanks shown in FIGS. 1 to 4 are made of a nickel-based alloy (Inconel® 718). In order for the rolled product to be finely grained according to the desired requirements, the rolling process was performed under the δ-Solvus temperature, as evidenced by process window $P_T$.

Tests were also performed on ring rolling blanks made of another nickel-based alloy, namely the alloy UDIMET® 720. Results were satisfactory also in this case.

In the following, the alloy spectra of test alloys used are provided:

|    | UDIMET ® 720 | Inconel ® 718 |
|----|--------------|---------------|
| Ni | Rest         | Rest          |
| Co | 14.7         |               |
| Fe |              | 18            |
| Cr | 16.0         | 18            |
| Mo | 3.0          | 3.0           |
| W  | 1.25         |               |
| Al | 2.0          | 0.45          |
| Ti | 5.0          | 0.9           |
| Nb |              | 5.0           |
| Zr | 0.03         |               |
| B  | 0.02         | 0.004         |

The ring rolling blanks were obtained from the nickel-based alloy by further processing of a forged billet, which was swaged in a first step, subsequently embossed and drilled in a third step. All process steps were hot forming steps.

If ring rolling products having a particular fine-grained texture are to be formed from ring blanks made of a nickel-based alloy, then the ring rolling blank may be preferably provided by a swaging process, since in this case the ring blank has a fine grain within a large volume.

With the contouring ring rolling process according to the present disclosure, more complex structures in the ring rolling product may also be obtained. In particular, in order to prevent an excessively fast cooling of the exposed regions, such as thinner segments or edges, it is necessary that these regions are adaptively and additionally heated during the ring rolling.

Due to the ring rolling process according to the present disclosure, it is possible to maintain a minimum deformation level over the entire cross section of the rolled product, in order to effectively suppress the formation of coarse grains.

While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

The invention claimed is:

1. A method for reproducibly producing a contoured ring rolling product fulfilling requirements for a rotating application, with a ring rolling machine controlled in a process-monitored manner, from a metal ring blank susceptible to cracking, comprising the steps of:

defining one or more process windows, extending over a rolling time, in relation to preselected process parameters for the contoured ring rolling product, the one or more process windows based on process parameters from calibrating specimens formed into rolled products by the ring rolling machine, the one or more process windows determined by the process parameters of the calibrating specimens that produced a rolled product which fulfills the requirements of the contoured ring rolling product, wherein the preselected process parameters comprise at least two of the following process parameters:

ring growing rate,
axial rolling force,
radial rolling force,
rolling time,
temperature of the ring blank during ring rolling; and subsequently ring rolling ring blanks in a contoured manner to produce ring rolling products, wherein rolling process parameters of the rolled ring blanks are detected with reference to the at least two preselected process parameters and evaluated to determine whether the rolling process parameters lie within the predefined one or more process windows, and only the ring rolling products that have been ring-rolled with rolling process parameters that lie within the one or more process windows are passed on for further machining and/or processing.

2. The method of claim 1, wherein the ring blank has a temperature during ring rolling which lies only slightly under its Solvus-temperature, or which is kept at such temperature by reheating the ring blank one or more times during ring rolling.

3. The method of claim 1, wherein regions of the cross section of the ring blank which are subject to a faster cooling are reheated during ring rolling.

4. The method of claim 1, wherein a first set of the calibrating specimens are rolled in the ring rolling machine using process parameters obtained from simulations.

5. The method of claim 1, wherein the ring blanks are produced from a nickel-based alloy.

6. The method of claim 5, wherein the ring blanks are made of an UDIMET® 720 or Inconel® 717 alloy.

7. The method of claim 1, wherein a rotating engine part is produced from the ring blank as the ring rolled product.

8. The method of claim 7, wherein the rotating engine part is a turbine disk.

9. A method for reproducibly producing a contoured ring rolling product fulfilling requirements for a rotating application, with a ring rolling machine controlled in a process-monitored manner, from a ring blank susceptible to cracking, comprising the steps of:

defining one or more process windows, extending over a rolling time, in relation to preselected process parameters for the contoured ring rolling product, the one or more process windows based on process parameters from calibrating specimens formed into rolled products by the ring rolling machine, wherein the one or more process windows are determined by the process parameters of the calibrating specimens that produced a rolled product which fulfills the requirements of the contoured ring rolling product, wherein the preselected process parameters comprise at least two of the following process parameters:

ring growing rate,
axial rolling force,
radial rolling force,
rolling time,
temperature of the ring blank during ring rolling; and subsequently ring rolling ring blanks in a contoured manner to produce ring rolling products, wherein at least one process parameter influencing a process window of the one or more process windows is used as a pilot variable for a machine-side rolling process control.

10. The method of claim 9, wherein rolling process parameters of the rolled ring blanks are detected with respect to the at least two preselected process parameters and are then evaluated to determine if the rolling process parameters lie within the predefined one or more process windows, and only the ring rolling products having been ring-rolled with rolling process parameters that lie within the one or more process windows are sent to a further machining and/or processing.

11. The method of claim 9, wherein the ring blank has a temperature during ring rolling which lies only slightly under its Solvus-temperature, or which is kept at such temperature by reheating the ring blank one or more times during ring rolling.

12. The method of claim 9, wherein regions of the cross section of the ring blank which are subject to a faster cooling are reheated during ring rolling.

13. The method of claim 9, wherein a first subset of the calibrating specimens are rolled in the ring rolling machine using process parameters obtained from simulations.

14. The method of claim 9, wherein the ring blanks are produced from a nickel-based alloy.

15. The method of claim 14, wherein the ring blanks are made of an UDIMET® 720 or Inconel® 717 alloy.

16. The method of claim 9, wherein a rotating engine part is produced from the ring blank as the ring rolled product.

17. The method of claim 16, wherein the rotating engine part is a turbine disk.

* * * * *